US005751488A

United States Patent [19]
Wade

[11] Patent Number: 5,751,488

[45] Date of Patent: May 12, 1998

[54] MOTORIZED SUNSCREEN FOR MOTOR VEHICLES

[76] Inventor: Craig Michael Wade, 816 W. Raynell, Springfield, Mo. 65807

[21] Appl. No.: 506,112

[22] Filed: Jul. 24, 1995

[51] Int. Cl.[6] ........ B60J 3/02

[52] U.S. Cl. ........ 359/601; 296/97.4

[58] Field of Search ........ 359/601, 602, 359/603, 604, 605, 606, 7, 608; 296/97.1, 97.4, 97.5, 97.7, 97.8, 138, 1.1; 160/370.21, 202, 211, DIG. 2, DIG. 3

[56] References Cited

U.S. PATENT DOCUMENTS

| | | | |
|---|---|---|---|
| Re. 33,804 | 1/1992 | Phillips | 160/84.1 |
| 4,921,299 | 5/1990 | Herrick | 296/97.11 |
| 5,044,686 | 9/1991 | Acenbrack | 296/97.7 |
| 5,100,194 | 3/1992 | Decker | 296/97.7 |
| 5,158,334 | 10/1992 | Felland | 296/97.1 |
| 5,160,827 | 11/1992 | Parker | 219/203 |
| 5,316,363 | 5/1994 | Tyutinman | 296/138 |
| 5,344,206 | 9/1994 | Middleton | 296/97.8 |
| 5,409,284 | 4/1995 | Mahler | 296/97.4 |
| 5,417,467 | 5/1995 | Viertal et al. | 296/152 |
| 5,418,644 | 5/1995 | Tsai | 359/601 |

*Primary Examiner*—Timothy P. Callahan
*Assistant Examiner*—My-Trang Nu Ton

[57] ABSTRACT

A motorized sunscreen for vehicles having telescoping-type sections, a nylon cord, a reversible electric motor that extends and retracts sections of the telescoping-type sunscreen in front of the windshield, a spring-loaded rocker switch that controls actuation of the motor to permit the sunscreen to be extended or retracted back into the motor vehicle's dash or displaced to cover the windshield, that has an electrical path from the battery of the vehicle through a flexible conductor which is also connected between the switch and the motor. A stationary storage compartment located beneath the motor vehicle's dash, a spring-loaded lid that covers the stored sunscreen on the surface of the dash that is pushed open when the sunscreen is displaced.

2 Claims, 2 Drawing Sheets

3
2
1
1
4
6
7
10
12
14
11
12
15

MOTORIZED SUNSCREEN FOR MOTOR VEHICLES

BACKGROUND OF THE INVENTION

1. Field of the Invention

The present invention relates to a motorized sunscreen for motor vehicles and particularly with a sunscreen which may be reversibly extended or retracted by an electric motor actuation with telescoping-type contoured hollowed sections which will retract smaller sections into larger sections when retracted and is housed under the dash in the storage compartment when not in use.

2. Description of the Prior Art

Sunscreens presently are manually displaced on motor vehicle's dash and taken down manually and are stored inside of motor vehicle's interior. They can be very frustrating to operate and easily damaged and is therefore inconvenient and disconsonant with modern life. Several devices have been invented which are useful in blocking sunrays from entering through the windshield.

U.S. Pat. No. Re 33,804 to Phillips (1992) presents a pleated sunshade held in a moveable mounting case on one side of the windshield post. It is a shade which has to be pulled across the windshield by the driver.

U.S. Pat. No. 5,100,194 to Decker (1992) incorporates a three panel sunscreen installed on the dashboard of the vehicle becoming a protective mat when the sunscreen is not in use but it cannot be electrically activated nor stored completely out of sight.

Another patent is U.S. Pat. No. 4,921,299 to Herrick (1990) which coils a sunshield within a permanently installed cylindrical container for storage. These containers are installed on opposite sides of the windshield and the sunshields are extended to join at the center. This must be done manually.

U.S. Pat. No. 5,409,284 to Mahler (1995) is an extendable sunvisor on a rotatable winding shaft to a retracted position and unwindable from the winding shaft to an extended position and is located behind the roof lining of the vehicle body.

U.S. Pat No. 5,418,644 (1995) to Tsai is a shading device for automobiles fixed on the roof of the interior for the apparatus to allow the shade to be pulled down to face the windshield.

U.S. Pat. No. 5,044,686 (1991) issued to Acenbrack is a retractable horizontal shade that is mounted to an apparatus meant to provide a storage area for a pleated sheet folded into a bundle. This mounting apparatus anchors the bottom of the shade when expanded for coverage.

U.S. Pat. No. 5,316,363 to Tyutinman (1994) is a shade mounted on a tubular frame in the interior of the automobile where an interconnecting cord runs to operate a system of shades for all windows controlled by pulling a handle. The motorized version has the same interior fram throughout the automobile as previously described but is energized by a pushbutton and part of the cord has a roller chain with a sprocket system. This invention was based on the use of a pulley system that has to be housed within the interior frame or attached directly to a facing panel.

U.S. Pat. No. 5,344,206 to Middleton (1994) pertains to an automotive sun shade assembly which includes a supply housing and a take-up housing. A sheet of material is rolled up onto a housing to the right or left of the driver. It includes a shade assembly with a rectangular frame element. In this respect, the motorized sunscreen in the present invention is different in that it telescopes contoured hollowed sections that slide one inside another like a retractable antenna (smaller into larger) when retracted and stored under the motor vehicle's dash when motor vehicle is parked.

Of the known sunscreens for motor vehicles, only the sunscreen provided by the present inventor and disclosed in the above identified patent application is capable of being powered by means of an electric motor and projected upward to cover the windshield by actuating a switch member or displaced to a housing for the retracted shade panels and stored under motor vehicle's dash in a stationary compartment when motor vehicle is parked. This allows for no obstructed views of the windshield also allowing more frequent use because of the ease of activation by the electrical switch therefore keeping damaging sunrays and heat build up out of the vehicle giving vehicle extended years of use.

There continues to be a need for a new and improved motor vehicle sunscreen which pertains to both the problem of ease of use as well as convenient storage.

SUMMARY

It is an object of the present invention to provide a sunscreen which is capable of being automatically extended or retracted by the operator by merely pressing a switch member to activate.

Another object of this invention is to provide a sunscreen to protect the dash and interior of motor vehicle from sunlight when parked.

It is a simple matter to extend or retract the sunscreen so that the driver does not have to store it or displace it manually. It is designed to be convenient to use and quick and easy to operate. This invention illustrates the use of a housing for the retracted motorized sunscreen to be located under the dash in a stationary storage compartment, therefore conveniently out of the way of the driver and passengers and the sunscreen is easily activated by the means of a rocker switch when the vehicle is parked.

The sunscreen with telescoping-type contoured hollowed sections that slide one inside another when retracted is designed to be displaced only when motor vehicle is parked to block sunlight from entering vehicle and consequently damaging the interior from excessive sunlight and heat.

There exists a continuing need for an improved device for keeping the damaging sunrays from the interior of parked motor vehicles. The present invention affords both protection to the interior and convenience of the driver for displacement.

It is therefore the object of the present invention to provide a new and improved motor vehicle sunscreen which has advantages over the prior art automobile shades and none of the disadvantages.

DESCRIPTION OF THE PREFERRED EMBODIMENTS

Figure 1:
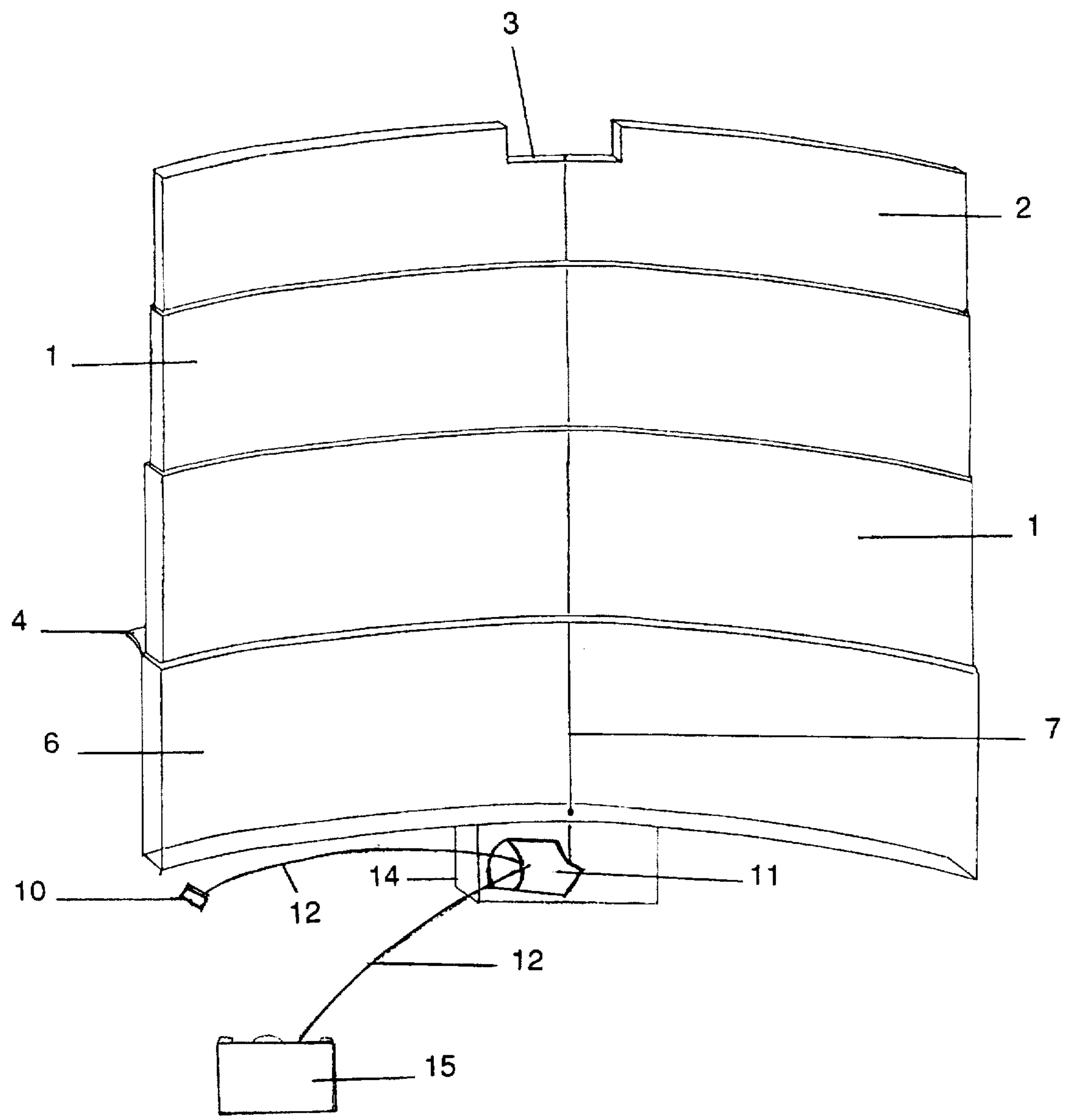
FIG. 1 is a perspective view showing the detailed internal structure of subject invention: extended sunscreen consisting of contoured hollow sections which are telescopic.

As shown in FIG. 1, the present invention is directed to a motorized sunscreen for motor vehicles including a contoured hollowed telescoping-type section 1, 1, 2 housed within a stationary storage compartment 6.

Another embodiment of the invention as shown in FIG. 1, is a spring-loaded lid 4 that covers the sunscreen when stored in stationary storage compartment 6 and is pushed open when the sunscreen is displaced. The sunscreen is capable of being extended and retracted by actuating a rocker switch member 10.

With regard to FIG. 1, when operating the motorized sunscreen of the present invention, while the vehicle is parked, the rocker switch 10 activates a reversible electric motor 11 which will drive a nylon cord 7 attached to the motor 11 and sunscreen sections 1, 1, 2 and secured to a center plane 3 of the top plane of the upper-most contoured hollowed telescopic section 2 and internally secured through the center of each section of sunscreen 1, 1, 2 as the motor drives the sunscreen up from the stationary storage compartment 6.

With regard to FIG. 1, the reversible electric motor 11 is mounted internally in a motor housing 14 which is secured underneath the stationary storage compartment 6 where a flexible conductor 12 provides an electrical path from the rocker switch 10 to the reversible electric motor 11 and a vehicle's electrical system (battery) 15.

Figure 2:
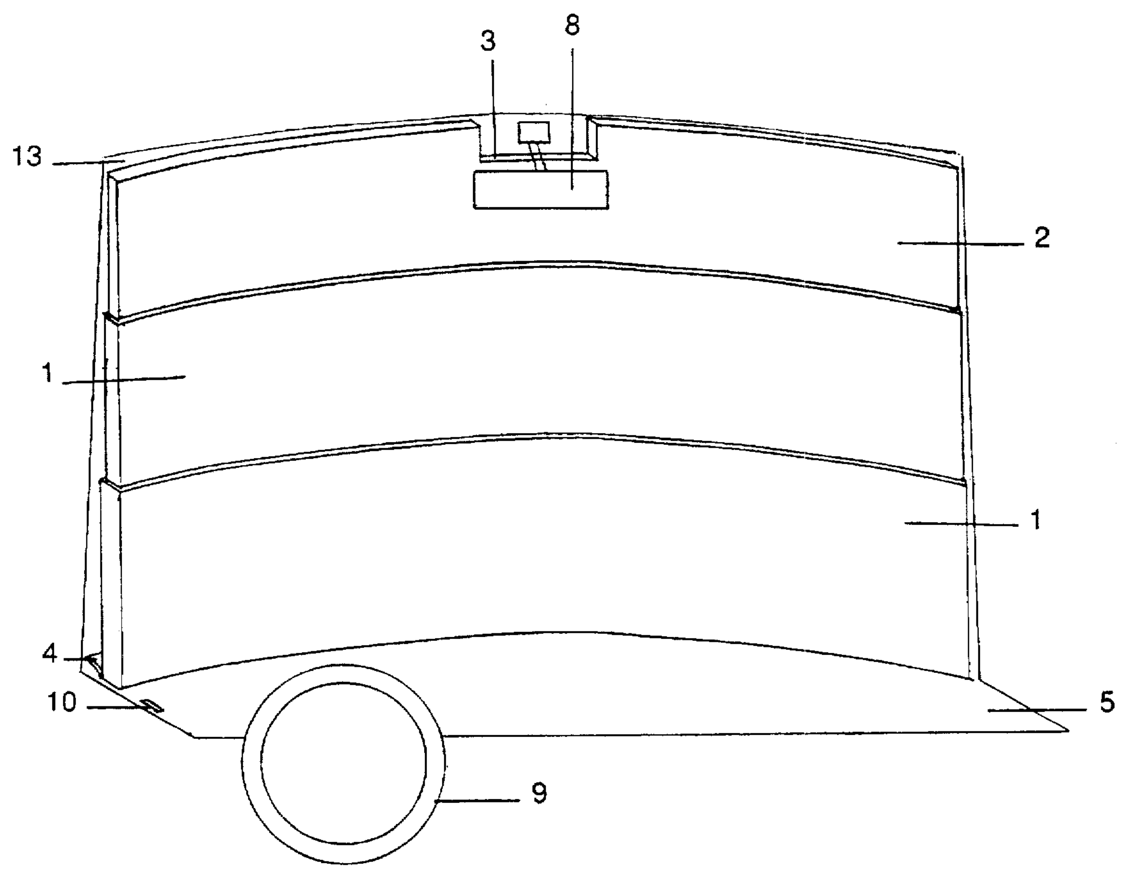
FIG. 2 is a view showing an embodiment of the invention where the sunscreen and automobile dash are combined and the sunscreen is fully extended inside the interior of the windshield.

With regard to FIG. 2, another embodiment of the contoured hollowed telescoping-type upper-most section 2, the center plane 3 has been lowered in relation to the top plane of section 2 to allow room for a rearview mirror 8.

With regard to FIG. 2, the contoured telescoping-type sections 1, 1, 2 are comprised of hollowed compartments that slide one inside another, smaller into larger, similar to a retractable antenna, used for housing the above smaller sections 1, 1, 2 when sunscreen is retracted beneath a vehicle's dash 5.

As shown in FIG. 2, another embodiment of the invention is a spring-loaded lid 4 mounted on the surface of motor vehicle's dash 5 that covers the sunscreen when stored and is pushed open when the sunscreen is displaced to the desired position in front of a windshield 13, blocking sunlight from entering the vehicle and damaging the dash 5 and the interior of the motor vehicle. The sunscreen is actuated by the rocker switch member 10 located on motor vehicle's dash 5 to the left of a steering wheel 9.

I claim:

1. A motorized sunscreen for motor vehicles having an electrical system, to be mechanically displaced to block sunlight from entering vehicle which includes: telescoping-type contoured hollowed sections housed within the motor vehicle's dash which are capable of being extended and retracted by the means of a reversible electric motor actuation located under said vehicle's dash; a nylon cord, which is stored coiled when said sunscreen is retracted, internally secured through the center of each section of said sunscreen to the center plane, beneath the area of the rearview mirror, of the top plane of the upper-most contoured hollowed section; a spring-loaded rocker switch mounted on the surface of said motor vehicle's dash to the left of the steering wheel; a flexible conductor connected between said switch, said reversible electric motor, and said vehicle's electrical system, to convert by means of electrical energy into the mechanical operation of said sunscreen; a spring-loaded lid that covers said sunscreen when stored, located on the surface of said vehicle's dash, which is pushed open when sunscreen is displaced to cover the windshield; a motor housing, for mounted reversible electric motor, secured underneath stationary storage compartment where retracted said sunscreen sections are housed.

2. The motorized sunscreen as recited in claim 1 further includes telescoping-type contoured sections which are hollowed and slide one inside another as it condenses similar to an electric retractable antenna and when retracted are housed under said vehicle's dash in said stationary storage compartment when said vehicle is parked.

* * * * *